(12) United States Patent
Bandic et al.

(10) Patent No.: US 8,736,993 B2
(45) Date of Patent: May 27, 2014

(54) FAILURE-RESISTANT MULTI-LUN HARD DISK DRIVE

(75) Inventors: Zvonimir Z. Bandic, San Jose, CA (US); Cyril Guyot, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 57 days.

(21) Appl. No.: 13/536,103

(22) Filed: Jun. 28, 2012

(65) Prior Publication Data

US 2014/0002922 A1    Jan. 2, 2014

(51) Int. Cl.
*G11B 27/00* (2006.01)
(52) U.S. Cl.
USPC ............... 360/13; 360/48; 360/72.1; 360/135
(58) Field of Classification Search
None
See application file for complete search history.

(56) References Cited

U.S. PATENT DOCUMENTS

| | | | |
|---|---|---|---|
| 6,934,804 | B2 | 8/2005 | Hashemi |
| 7,093,069 | B2 | 8/2006 | Chong, Jr. |
| 7,095,342 | B1 | 8/2006 | Hum et al. |
| 7,523,201 | B2 | 4/2009 | Lee et al. |
| 7,568,216 | B2 | 7/2009 | Spry et al. |
| 7,716,433 | B2 | 5/2010 | Dutta et al. |
| 7,844,444 | B1 | 11/2010 | Asbridge et al. |
| 7,890,504 | B2 | 2/2011 | Nasre et al. |
| 8,028,141 | B2 | 9/2011 | Bakke et al. |

*Primary Examiner* — Wayne Young
*Assistant Examiner* — Brian Butcher
(74) *Attorney, Agent, or Firm* — Brokaw Patent Law PC; Stephen J. Shaw; Christopher J. Brokaw

(57) ABSTRACT

Approaches are provided for a hard-disk drive (HDD) and techniques for using multiple LUNs per HDD where each LUN is mapped to a head/disk interface. In one example, a HDD generates multiple LUNs and assigns each to a single head, such that data written by a first head is only associated to a first LUN, and so forth.

18 Claims, 7 Drawing Sheets

FAILURE-RESISTANT MULTI-LUN HARD DISK DRIVE

TECHNICAL FIELD

This application relates generally to hard disk drives, and more specifically, to methods, systems and devices for the utilization of multiple LUNs (logical unit numbers) in a hard disk drive with multiple heads.

BACKGROUND

The increasing use of computer technology in recent years has created a need for larger-capacity storage devices to hold the multitudes of digital files created and used by people on a daily basis. In addition to an increase in the sheer number of pictures, videos, songs and other types of files used by individuals, these files have become larger in size as quality has improved.

Hard disk drive (HDD) technology has addressed this need for larger, faster and more reliable HDDs by incorporating advances such as multiple disk platters per drive, multiple read/write head interfaces (heads) per drive, redundancy through the use of RAID, the use of abstraction techniques such as Logical Unit Numbers (LUN) and so forth.

When HDDs increase storage by adding multiple disk platters in a drive with a head for each disk surface, there is an increased risk of losing access to the entire drive in the event a single head fails. Even if the entire drive is not rendered inoperable by a head failure and commands can still be issued to the drive, reads and writes corresponding to the failed head will fail. Because of serpentine formatting, it is not feasible for a host device to keep using the Logical Block Addresses (LBA) corresponding to the working heads, and ignore the others. This becomes especially problematic as the number of heads per drive increases, because a user may want to continue using the portion of the HDD that is theoretically functional.

SUMMARY

Embodiments are directed towards devices, systems and methods for the utilization of multiple LUNs per HDD where each LUN is mapped to a single head/disk interface.

In an embodiment, a HDD is provided comprising a plurality of heads attached to a plurality of sliders, a plurality of disks rotatably mounted on a spindle, a drive motor having a motor shaft attached to the spindle for rotating the disk, a voice-coil motor configured to move the heads to access portions of the disks; and one or more electronic components configured to perform a series of steps. These steps include generating a plurality of logic unit numbers (LUNs), including a first and second LUN. The first LUN is then assigned to a first head of the plurality of heads and the second LUN is assigned to a second head of the plurality of heads. Data written by the first head is associated only to the first LUN and data written by the second head is associated only to the second LUN. In this example embodiment, the first LUN and second LUN are presented to a host system as independent logical devices.

In an embodiment, a non-transitory computer readable medium is provided, having stored thereon instructions for causing one or more processing units to execute a method, comprising a series of steps. These steps include generating a plurality of logic unit numbers (LUNs), including a first and second LUN. The first LUN is then assigned to a first head of the plurality of heads and the second LUN is assigned to a second head of the plurality of heads. Data written by the first head is associated only to the first LUN and data written by the second head is associated only to the second LUN. In this example embodiment, the first LUN and second LUN are presented to a host system as independent logical devices.

In an embodiment, a HDD is provided comprising a plurality of heads attached to a plurality of sliders, a plurality of disks rotatably mounted on a spindle, a drive motor having a motor shaft attached to the spindle for rotating the disk, a voice-coil motor configured to move the heads to access portions of the disks; and one or more electronic components configured to perform a series of steps. These steps include generating a plurality of unique identifiers, including a first and second identifier, and assigning the first identifier to a first head of the plurality of heads and the second identifier to a second head of the plurality of heads. Data written by the first head is assigned only to the first identifier and data written by the second head is assigned only to the second identifier. In this example embodiment, the first and second identifiers are associated with a logical unit of the HDD, and this association is managed by the HDD.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Some embodiments are illustrated by way of example and not limitation in the figures of the accompanying drawings in which.

DETAILED DESCRIPTION

Approaches for utilizing multiple LUNs per HDD are described within. In the following description, for the purposes of explanation, numerous specific details are set forth in order to provide a thorough understanding of the example embodiments described herein. It will be apparent, however, that the example embodiments described herein may be practiced without these specific details. In other instances, well-known structures and devices are shown in block diagram form in order to avoid unnecessarily obscuring the example embodiments described herein.

Physical Description of Illustrative Example Embodiments

Figure 1:
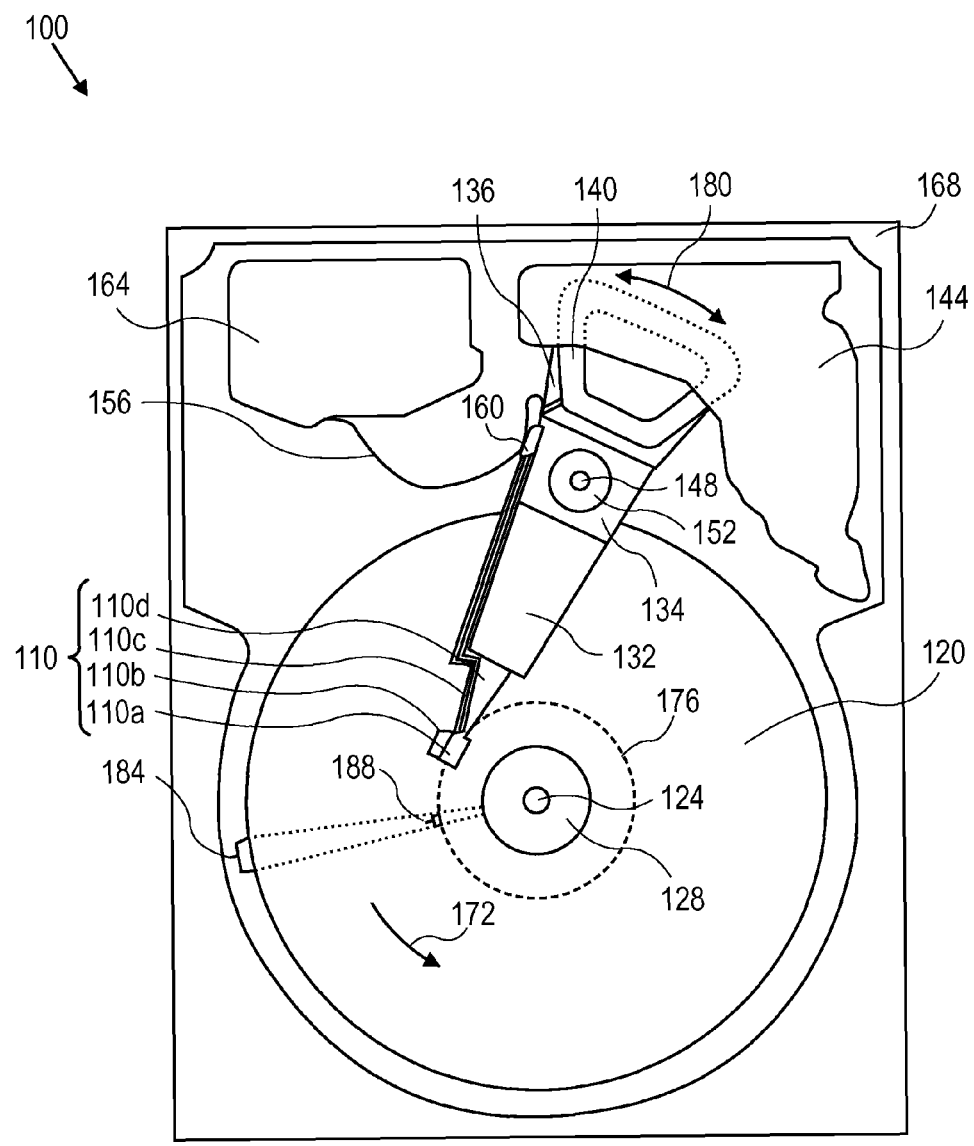
FIG. 1 is a plan view of an HDD according to an example implementation.

Embodiments of the invention may be used to implement multiple LUNs per HDD; in one example, each LUN is mapped to a single head. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110B and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
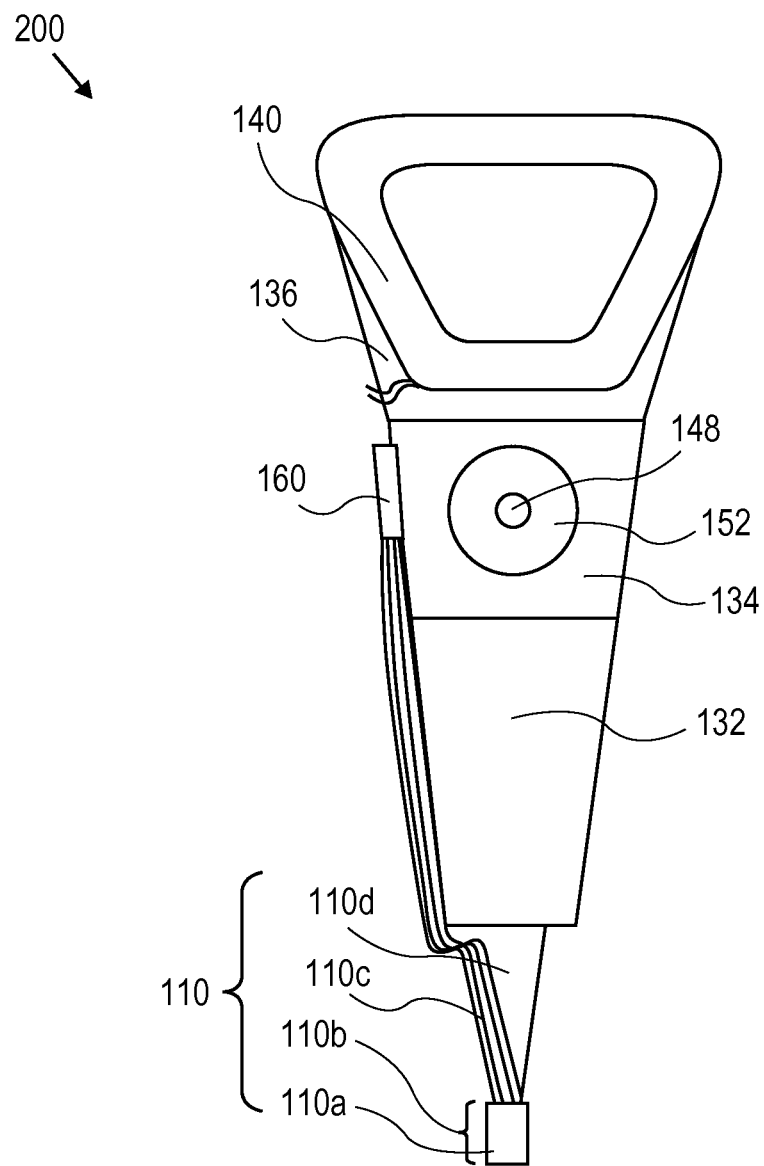
FIG. 2 is a plan view of a head-arm-assembly (HAA) according to an example implementation.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
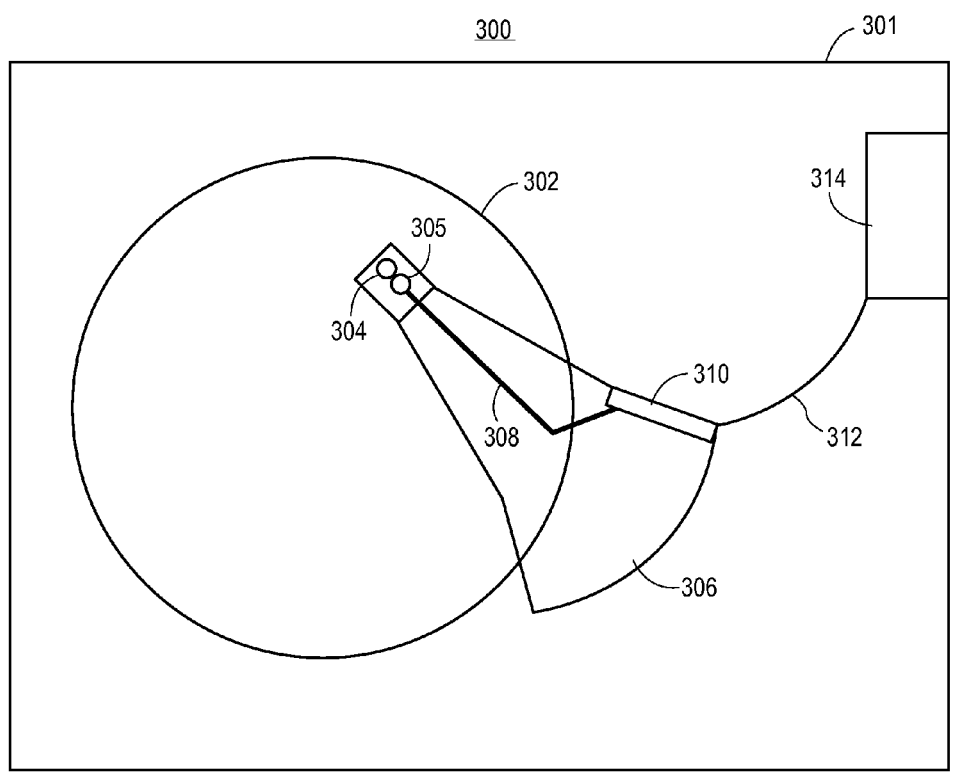
FIG. 3 is an illustration of a read/write circuit within an HDD according to an example implementation.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Functional Overview

Example devices, methods and systems for utilizing multiple LUNs per HDD are discussed. In the following description, for purposes of explanation, numerous specific details are set forth in order to provide a thorough understanding of example embodiments. It will be evident, however, to one skilled in the art that the present subject matter may be practiced without these specific details. It will also be evident that the types of configuration details described herein are not limited to the examples provided and may include other scenarios not specifically discussed.

In one example approach, techniques are presented for the utilization of multiple LUNs per HDD where each LUN is mapped to a single head/disk interface (also referred to herein simply as "heads"); for example, in a HDD with four disks (also platters), where each disk has two sides with media on each side and heads on each side for a total of eight heads, there are eight LUNs wherein each LUN is mapped to a single head of the eight. In another example approach, there is one LUN per subset of heads; for example, in a single HDD with four disks, where each disk has two sides with media on each side and heads on each side for a total of eight heads, there are four LUNs where each LUN is mapped to only two of the heads.

Using multiple LUNs in a HDD with multiple heads

A LUN is traditionally a unique identifier used to designate individual or collections of storage devices for address by a protocol usually associated with a SCSI, iSCSI, Fibre Channel (FC) or similar interface. In this context, each LUN identifies a specific logical unit, which may be a part of a hard disk drive, an entire hard disk or several hard disks in a storage device. So a LUN could reference an entire RAID set, a single disk or partition, or multiple hard disks or partitions. In any case, the logical unit is treated as if it is a single device and is identified by the LUN. For purposes of this disclosure, implementations of a LUN are not limited to SCSI technology or any other particular HDD approach. Additionally, a LUN in the context of the present disclosure may be construed as a generic term representing a unit of storage that a host is able to communicate with using its own set of commands and properties; in other words, it is the subdivision of a physical device into multiple independent logical devices. A LUN is enforced and/or managed by the device, while a disk partition is a construct that is only enforced and/or managed by the host; therefore, for purposes of this disclosure, the definition of a LUN does not include the concept of a disk partition.

Typically, drives have operated with a single LUN. Larger HDD systems have incorporated multiple LUNs in order to serve multiple groups of users; for example, by creating one LUN allocated to one group of users. Each LUN in this case behaves as a self-contained storage device, and the host operating system sees different LUNs as separate storage devices.

Figure 4:
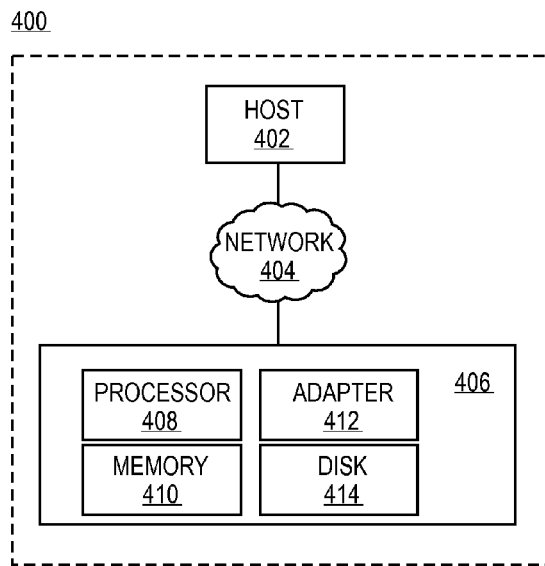
FIG. 4 is a depiction of an example storage approach providing access to a storage device.

FIG. 4 is a depiction of an example storage approach 400 providing access to a storage device. The example approach 400 of FIG. 4 comprises one or more host systems 402, a network connection 404 and one or more storage devices 406. For clarity, only one host system 402 and storage device 406 are shown in FIG. 4. The host system 402 and storage device 406 are capable of communicating via a network 404 which may be, for example, a direct connection, a local area network (LAN), a wide area network (WAN), a virtual private network (VPN), a combination of LAN, WAN and VPN implementations, or other suitable communication network. In this example implementation, the host system 402 is implemented as a stand-alone computer capable of communicating with storage device 406, although alternate embodiments are envisioned wherein host system 402 comprises multiple devices, mobile devices, tablet computers, gaming consoles, or any other computing device with a processor. Host system 402 may be a general-purpose computer configured to execute applications including file system protocols such as, for example, the Network File System (NFS) or the Common Internet File System (CIFS) protocol or other suitable protocols. Host system 402 may also be able to interact with storage device 406 in a client-server arrangement. Host system 402 may be implemented as a file server or similar device.

The storage device 406 of the example in FIG. 4 comprises one or more processors 408, one or more memory components 410, one or more adapters 412 and one or more disks 414. The one or more processors 408 are capable of executing instructions and otherwise performing all functions of a processor as known in the art. The one or more memory components 410 may be implemented as ROM, RAM, NVRAM, flash memory or any other type of transitory or non-transitory computer-readable storage medium capable of storing electronic data, and may operate as main memory, cache memory, buffer memory or any other type of memory. The one or more adapters 412 may comprise network adapters capable of sending and receiving data via a network 404, for example. The one or more adapters 412 may additionally comprise storage adapters such as SCSI adapters. The one or more disks 414 may comprise standard HDD disk platters and heads. The components in the storage device 406 may be communicatively coupled according to techniques known in the art.

The storage device 406 may be implemented as a standard HDD; however, in the example implementation of FIG. 4, additional modules are illustrated for clarity. It should be understood that fewer or additional modules not explicitly shown in FIG. 4 may also be included in storage device 406 in other implementations, and no limitations to the example embodiments described within should be assumed.

In another example embodiment, all elements or components that are associated with each of the devices 402 and 406 are implemented in a single device such as, for example, the host system 402. In this alternate example, the elements in storage device 406 would be implemented in the host system 402. Additional modules not explicitly shown in FIG. 4 may also be included in the host system 402 and storage device 406 in other implementations. In an example embodiment, there is multiple storage devices 406 configured in a redundant array of independent disks (RAID) or similar arrangement. The storage device 406 could expose one or more disks 414 as several independent devices, the size of which could be configurable by host system 402. Each of those devices could be a different LUN.

Figure 5:
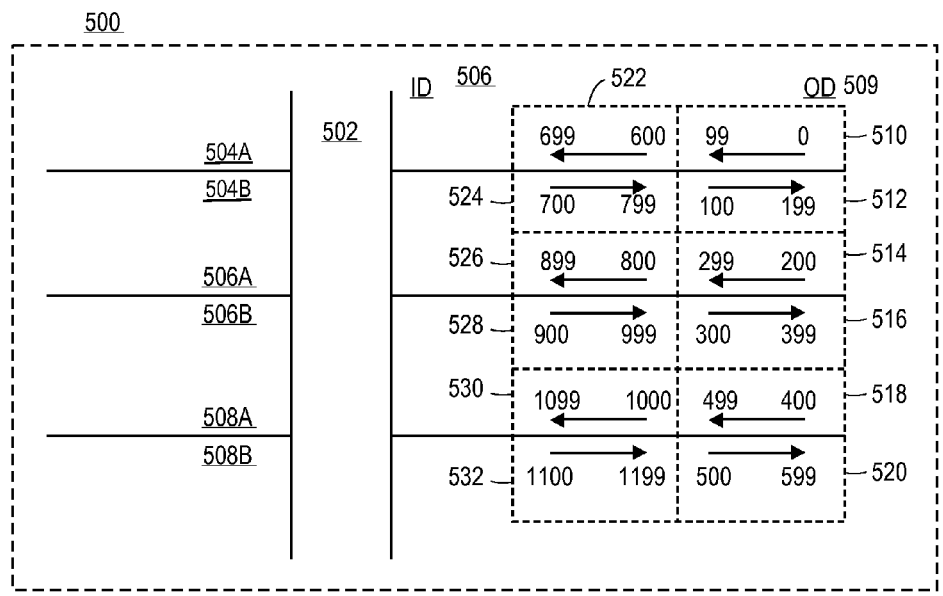
FIG. 5 is an illustration of a HDD utilizing a serpentine format in accordance with an example embodiment.

FIG. 5 is an illustration of a HDD 500 utilizing a serpentine format in accordance with an example embodiment. The HDD example of FIG. 5 is comprised of three disk platters (disks) 504-508, each with two sides with media on each side and heads on each side (not pictured) for a total of six heads. The disks are each rotating identically around a spindle 502 and have an inner diameter 506 and outer diameter 509. The inner diameter 506 and outer diameter 509 elements are merely for reference.

In the serpentine format example depicted in FIG. 5, each disk surface, top and bottom, has data written to it in a back-and-forth approach, and in this manner, data is written to all sides of each disk in the HDD. For example, given a blank HDD, data is first written to a first span 510 on the top side of the first disk 504a by a head #0 (not pictured). Data is written from outer diameter 509 toward inner diameter 506, and the first 99 LBAs are written to, in this example, LBAs 0-99. Then, a head #1 (not pictured) on the bottom side of the first disk 504b writes to a second span 512 (LBAs 100-199), from inner diameter 506 to outer diameter 509. Then, a head #2 (not pictured) on the top side of the second disk 506a writes to a third span 514 (LBAs 200-299), from outer diameter 509 to inner diameter 506. Then, a head #3 (not pictured) on the bottom side of the second disk 506b writes to a fourth span 512 (LBAs 300-399), from inner diameter 506 to outer diameter 509. Then, a head #4 (not pictured) on the top side of the third disk 508a writes to a fifth span 518 (LBAs 400-499), from outer diameter 509 to inner diameter 506. Then, a head #5 (not pictured) on the bottom side of the third disk 508b writes to a sixth span 520 (LBAs 500-599), from inner diameter 506 to outer diameter 509.

After traversing a portion of each disk surface in this manner, in the example of FIG. 5, data is then written on the top side of the first disk 504a by head #0 to a seventh span 522 (LBAs 600-699) adjacent to first span 510, from outer diameter 509 toward inner diameter 506. This proceeds in like manner as data is required to be written to new LBAs. Given this example, it is now clear why losing a head can cause the entire drive to become inaccessible. If, in the example of FIG. 5, head #0 the top side of the first disk 504a fails, then LBAs 0-99 in the first span 510 and LBAs 600-699 in the seventh span, along with any other LBAs written to by head #0, are inaccessible. Because the file system of host 402 in this example doesn't have access to the specifics of this mapping, host system 402 may try to write to a LBA that can't be written to; therefore, the entire drive must be taken offline.

Figure 6:
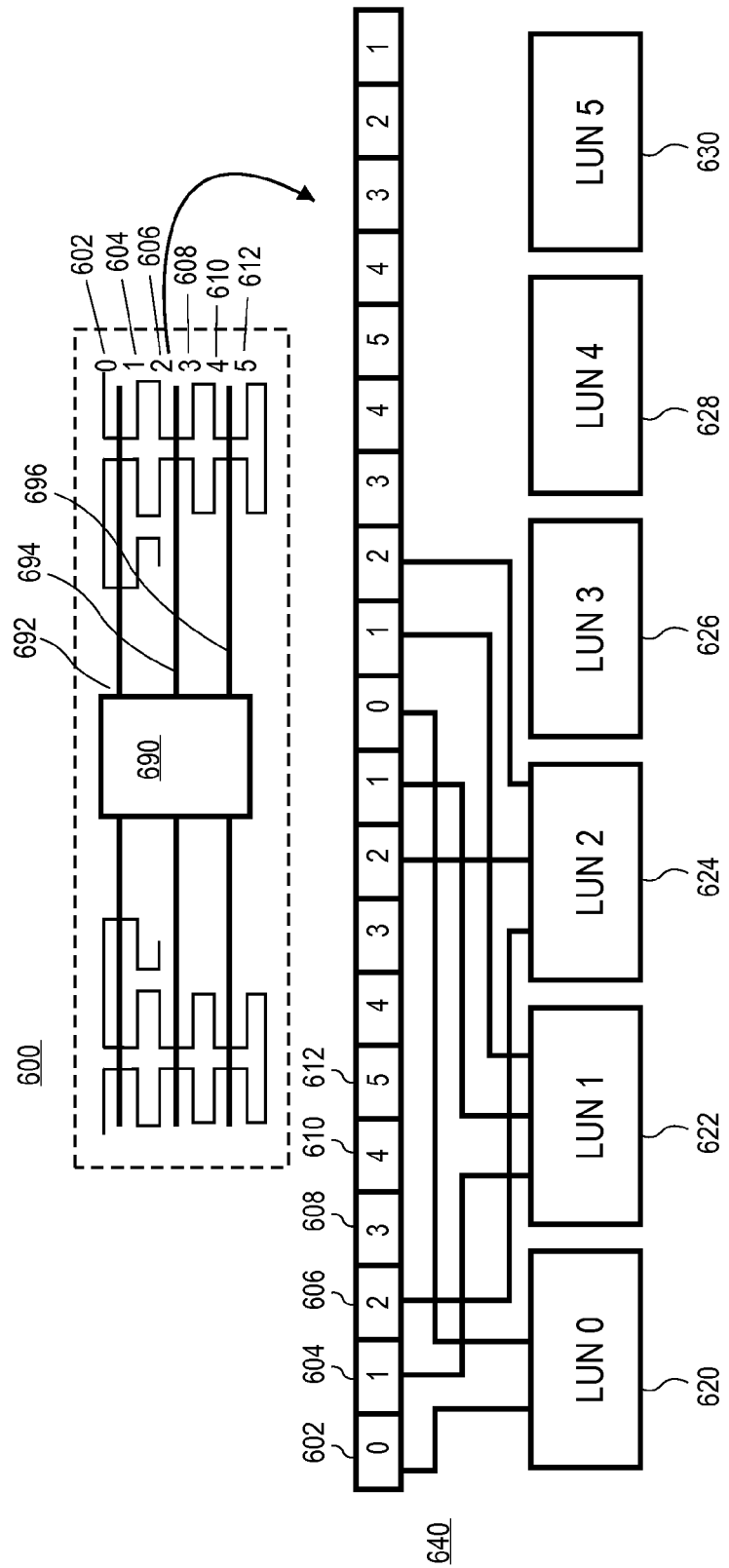
FIG. 6 is a an illustration of an example HDD in accordance with an example embodiment.

This problem may be addressed by, in one example, assigning a LUN to each head of a HDD. FIG. 6 illustrates an example HDD 600 in accordance with an embodiment. HDD 600 has three disk platters 692-696, each having two sides on which data may be written. There are 6 heads 602-612, one for each surface of HDD 600. Each head 602-612 is assigned to a single LUN 620-630, as seen in the exploded diagram 640 of FIG. 6. LUN 0 620 is mapped to Head 0 602, LUN 1 622 is mapped to HEAD 1 604, LUN 2 624 is mapped to HEAD 2 606, and so on. Once each head is mapped to a given LUN, the host system 402 can combine the multiple LUNs if desired, such as in a RAID approach, but host system 402 is not limited in how it may choose to allocate data to the respective LUNs. Serpentine formatting is still available in example embodiments utilizing the techniques described herein; however, example embodiments are not limited to serpentine formatting, because any technique currently available to HDDs are available in embodiments of the presently-described approaches.

In the manner of this example embodiment, if a HDD has 5 platters of 2 TB each and 10 heads for a total capacity of 10 TB, and one head were to fail, only 1 TB would be lost instead of the entire 10 TB drive. If the host system 402 were operating the HDD of the present example in a RAID format or other format offering data replication, then the lost TB could be recovered by reading data from operating LUNs, reconstructing the data stored on the LUN corresponding to the failed head and storing it on another LUN. If managed accordingly by a host, in the event of a drive reporting that a LUN has failed, the host will recognize that the head associated with that LUN has failed. The host recognizes that the files associated with that head are no longer accessible and takes steps to replicate them. In mappings done with current approaches where each head is not assigned to a single LUN, files would be lost because host system 402 would have randomly assigned files to the lost LBAs.

According to an example embodiment, a single LUN may be assigned to a subset of heads. For example, in a single HDD with four disks, where each disk has two sides with media on each side and heads on each side for a total of eight heads, there may be four LUNs where each LUN is mapped to only two of the heads.

According to an example, the present techniques are applicable to SCSI devices, which use multiple LUNs, as well as to SATA devices, which operate with the concept of multiple ports. Instead of assigning a LUN to an individual head or subset of heads, a port may be assigned.

The present techniques may be implemented with HDDs utilizing either Perpendicular Magnetic Recording (PMR) techniques or Shingled Magnetic Recording (SMR) techniques. When using SMR, the mapping of LBAs to physical locations on a disk will attempt to be as sequential as possible. The use of multiple LUNs assigned to individual heads could adversely affect the standard operation of SMR if the sequential writing requires a HDD to write to multiple surfaces at the same time, or otherwise break the independent LUN paradigm as described herein.

Figure 7:
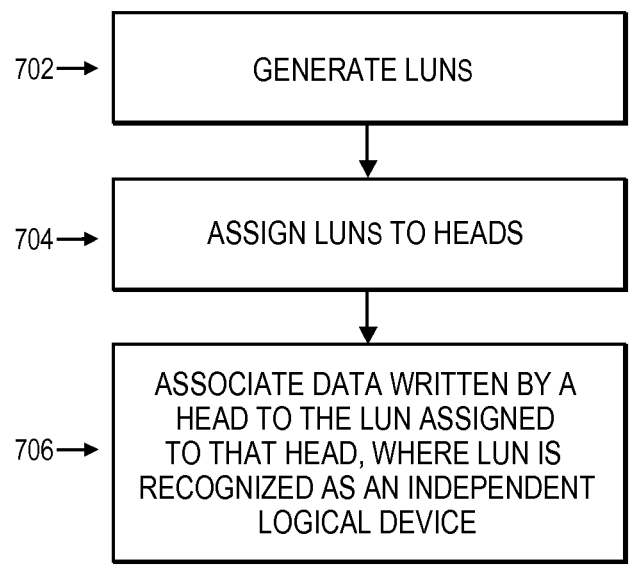
FIG. 7 is a flow diagram illustrating the steps involved in implementing multiple LUNs per HDD where each LUN is mapped to a given head in accordance with an example embodiment.

FIG. 7 is a flow diagram 700 illustrating example steps involved in implementing multiple LUNs per HDD where each LUN is mapped to a given head in accordance with an example embodiment. In step 702, LUNs are generated, and in step 704 each of the generated LUNs is assigned to a single head; although, in other example embodiments, there may be one LUN per subset of heads or LUNs may be assigned per disk platter. LUNs may be generated and/or assigned at the time of HDD manufacture, or in some example embodiments, the host system is capable of generating, assigning and/or managing the LUNs at any time.

In step 706, data written by a head is associated with the one of the LUNs assigned to that head, where the LUN is recognized by a host system as an independent logical device.

FIG. 7 provides an example method 700 of implementing multiple LUNs per HDD. In other examples, only one or some subset of these operations may be included, as each operation may stand alone, or may be provided in some different order other than that shown in FIG. 7.

Hardware Mechanisms

Figure 8:
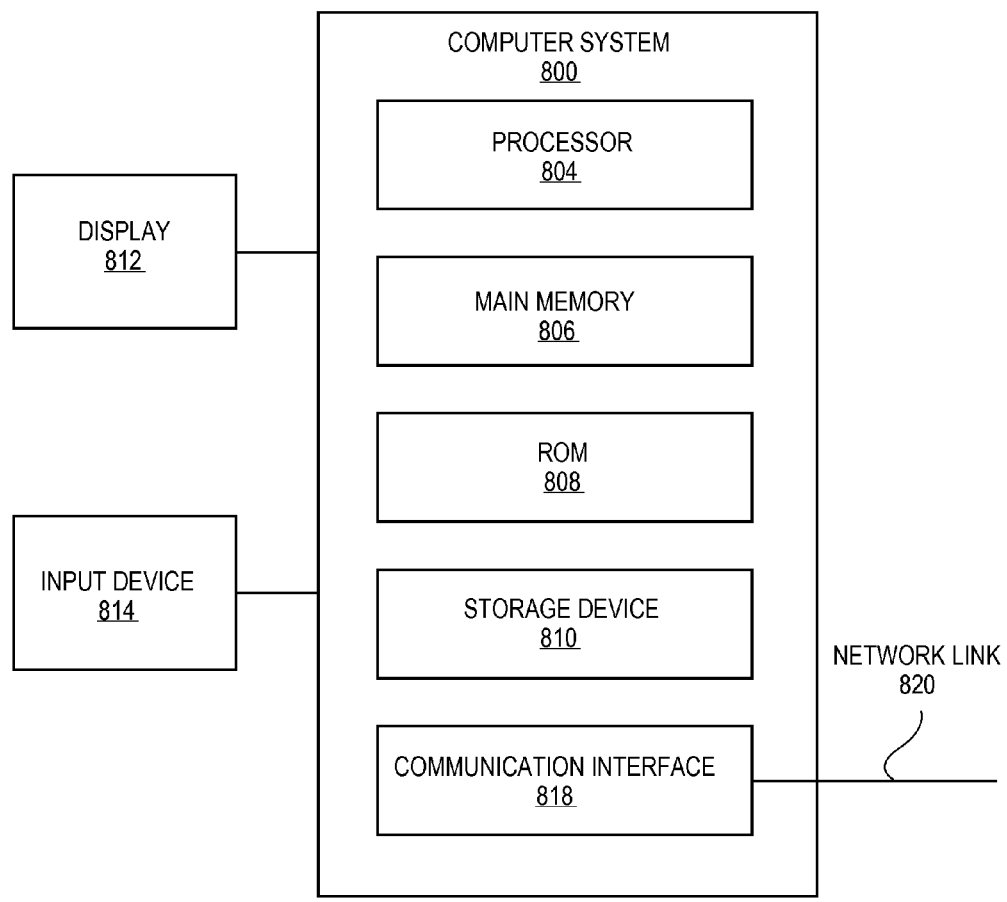
FIG. 8 is a block diagram that illustrates a computer system upon which an embodiment may be implemented.

In an embodiment, device 100 of FIG. 1 may be implemented on, include, or correspond to a computer system. FIG. 8 is a block diagram that illustrates a computer system 800 upon which an embodiment may be implemented. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments may include any number of input devices 814 coupled to computer system 800.

Embodiments are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any non-transitory tangible medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD) configured to utilize multiple LUNs, comprising:
   a plurality of heads attached to a plurality of sliders;
   a plurality of disks rotatably mounted on a spindle;
   a drive motor having a motor shaft attached to the spindle for rotating the disk;
   a voice-coil motor configured to move the heads to access portions of the disks,
      wherein the HDD is configured to utilize Shingled Magnetic Recording (SMR); and
   one or more electronic components configured to:
      generate a plurality of logic unit numbers (LUNs), including a first and second LUN;
      assign the first LUN to a first head of the plurality of heads;
      assign the second LUN to a second head of the plurality of heads;
      prevent data from being written to more than one side of one of the plurality of disks at any one time; and
      associate data written by the first head only to the first LUN and data written by the second head only to the second LUN,
         wherein the first LUN and second LUN are presented to a host system as independent logical devices.

2. The hard-disk drive of claim 1, wherein each of the plurality of LUNs is assigned to only one of the plurality of heads.

3. The hard-disk drive of claim 1, wherein each of the plurality of LUNs are assigned to more than one of the plurality of heads.

4. The hard-disk drive of claim 1, wherein the HDD is configured to utilize serpentine formatting.

5. The hard-disk drive of claim 1, wherein the number of LUNs is less than or equal to the number of heads.

6. A non-transitory computer readable medium having stored thereon instructions for causing one or more processing units to execute a method, comprising:
   executing instructions to cause generating a plurality of logic unit numbers (LUNs), including a first and second LUN, for a hard disk drive (HDD) comprising a plurality of heads attached to a plurality of sliders, and wherein the HDD is configured to utilize Shingled Magnetic Recording (SMR);
   executing instructions to cause assigning the first LUN to a first head of the plurality of heads;
   executing instructions to cause assigning the second LUN to a second head of the plurality of heads;
   executing instructions to cause associating data written by the first head only to the first LUN and data written by the second head only to the second LUN, wherein the first LUN and second LUN are presented to a host system as independent logical devices; and executing instructions to cause preventing data from being written to more than one side of one of the plurality of disks at any one time.

7. The non-transitory computer readable medium of claim 6, wherein each of the plurality of LUNs is assigned to only one of the plurality of heads.

8. The non-transitory computer readable medium of claim 6, wherein each of the plurality of LUNs are assigned to more than one of the plurality of heads.

9. The non-transitory computer readable medium of claim 6, wherein the HDD is configured to utilize serpentine formatting.

10. The non-transitory computer readable medium of claim 6, wherein the first and second LUNs are generated and assigned at time of HDD manufacture.

11. The non-transitory computer readable medium of claim 6, wherein the first and second LUNs are generated and assigned by the host system.

12. The non-transitory computer readable medium of claim 6, further comprising:
executing instructions to cause recognizing that the first head associated with the first LUN has failed; and
executing instructions to cause restoring the data written to the first LUN to another of the plurality of LUNs.

13. The non-transitory computer readable medium of claim 6, wherein the number of LUNs is less than or equal to the number of heads.

14. A hard-disk drive (HDD) configured to utilize multiple LUNs, comprising:
a plurality of heads attached to a plurality of sliders;
a plurality of disks rotatably mounted on a spindle;
a drive motor having a motor shaft attached to the spindle for rotating the disk;
a voice-coil motor configured to move the heads to access portions of the disks,
wherein the HDD is configured to utilize Shingled Magnetic Recording (SMR); and
one or more electronic components configured to:
generate a plurality of unique identifiers, including a first and second identifier;
assign the first identifier to a first head of the plurality of heads;
assign the second identifier to a second head of the plurality of heads
prevent data from being written to more than one side of one of the plurality of disks at any one time; and
associate data written by the first head only to the first identifier and data written by the second head only to the second identifier,
wherein the first and second identifiers are associated with a logical unit of the HDD, and this association is managed by the HDD.

15. The hard-disk drive of claim 14, wherein the plurality of unique identifiers comprises SATA ports.

16. A hard-disk drive (HDD) configured to utilize multiple LUNs, comprising:
a plurality of heads attached to a plurality of sliders;
a plurality of disks rotatably mounted on a spindle;
a drive motor having a motor shaft attached to the spindle for rotating the disk;

a voice-coil motor configured to move the heads to access portions of the disks; and
one or more electronic components configured to:
generate a plurality of logic unit numbers (LUNs), including a first and second LUN;
assign the first LUN to a first head of the plurality of heads;
assign the second LUN to a second head of the plurality of heads; and
associate data written by the first head only to the first LUN and data written by the second head only to the second LUN,
wherein the first LUN and second LUN are presented to a host system as independent logical devices, and
wherein the first and second LUNs are generated and assigned at time of HDD manufacture.

17. A hard-disk drive (HDD) configured to utilize multiple LUNs, comprising:
a plurality of heads attached to a plurality of sliders;
a plurality of disks rotatably mounted on a spindle;
a drive motor having a motor shaft attached to the spindle for rotating the disk;
a voice-coil motor configured to move the heads to access portions of the disks; and
one or more electronic components configured to:
generate a plurality of logic unit numbers (LUNs), including a first and second LUN;
assign the first LUN to a first head of the plurality of heads;
assign the second LUN to a second head of the plurality of heads;
associate data written by the first head only to the first LUN and data written by the second head only to the second LUN,
wherein the first LUN and second LUN are presented to a host system as independent logical devices, and
wherein the first and second LUNs are generated and assigned by the host system.

18. A hard-disk drive (HDD) configured to utilize multiple LUNs, comprising:
a plurality of heads attached to a plurality of sliders;
a plurality of disks rotatably mounted on a spindle;
a drive motor having a motor shaft attached to the spindle for rotating the disk;
a voice-coil motor configured to move the heads to access portions of the disks; and
one or more electronic components configured to:
generate a plurality of logic unit numbers (LUNs), including a first and second LUN;
assign the first LUN to a first head of the plurality of heads;
assign the second LUN to a second head of the plurality of heads;
associate data written by the first head only to the first LUN and data written by the second head only to the second LUN,
wherein the first LUN and second LUN are presented to a host system as independent logical devices;
recognize that the first head associated with the first LUN has failed; and
restore the data written to the first LUN to another of the plurality of LUNs.

* * * * *